United States Patent [19]

Patel et al.

[11] Patent Number: 5,555,155
[45] Date of Patent: Sep. 10, 1996

[54] ELECTROCHEMICAL CAPACITOR USING PROTON-CONDUCTING ELECTROLYTE AND METHOD OF MAKE SAME

[75] Inventors: Hitendra K. Patel, Palatine; Changming Li, Vernon Hills, both of Ill.

[73] Assignee: Motorola Energy Systems, Inc., Schaumburg, Ill.

[21] Appl. No.: 391,742

[22] Filed: Feb. 21, 1995

[51] Int. Cl.$^6$ .............................. H01G 9/00; H01G 9/004
[52] U.S. Cl. .......................... 361/503; 361/502; 361/504; 361/508; 361/516; 29/25.03
[58] Field of Search .................................. 361/502, 512, 361/522, 524, 503, 504, 525, 508, 516; 29/25.03; 429/160, 213, 218, 232

[56] References Cited

PUBLICATIONS

Performance Evaluation of Polypyrrole and Polyanile as Active Materials for Electrochemical Capacitors, Rudge, et al, Los Alamos National Laboratory, New Mexico.

*Primary Examiner*—Leo P. Picard
*Assistant Examiner*—Anthony Dinkins
*Attorney, Agent, or Firm*—Kenneth M. Massaroni

[57] ABSTRACT

An electrochemical capacitor device (10) fabricated of a plurality of stacked subassemblies (12, 14) and capped with end portions (16, 18). The device (10) includes a current conducting electrode (22) having a layer of a second electrode material disposed on each side thereof (40) (42). The device (10) further includes a proton conducting electrolyte.

17 Claims, 5 Drawing Sheets

ELECTROCHEMICAL CAPACITOR USING PROTON-CONDUCTING ELECTROLYTE AND METHOD OF MAKE SAME

TECHNICAL FIELD

This invention relates in general to the field of rechargeable electrochemical capacitors, and particularly to methods of fabricating electrochemical capacitors.

BACKGROUND OF THE INVENTION

Electrochemical capacitors are a class of high rate energy storage devices which use electrolytes and electrodes of various kinds in a system similar to that of conventional batteries. Electrochemical capacitors like batteries are essentially energy storage devices. However unlike batteries, capacitors rely on charge accumulation at the electrolyte/electrode interface to store energy. Charge storage in electrochemical capacitors therefore, is a surface phenomena. Conversely, charge storage in batteries is a bulk phenomena occurring within the bulk of the electrode material.

Electrochemical capacitors can generally be divided into one of two subcategories. Double layer capacitors in which the interfacial capacitance at the electrode/electrolyte interface can be modeled as two parallel sheets of charge; and pseudocapacitor devices in which charge transfer between the electrolyte and the electrode occurs over a wide potential range, and is the result of primary, secondary, and tertiary oxidation/reduction reactions between the electrode and the electrolyte. These types of electrochemical capacitors are currently being developed for high pulse power applications.

Most of the known electrochemical capacitor active materials are based on metallic elements such as platinum, iridium, ruthenium, or cobalt. These materials are generally quite expensive and pose a significant hurdle to the widespread commercialization of this technology. Moreover, to the extent that these devices have been fabricated, they have heretofore, relied upon traditional battery technology when approaching the question of appropriate electrolytes to be used in connection with such devices. Accordingly, electrolytes used in these devices have generally been conventional aqueous electrolytes such as potassium hydroxide (KOH). Unfortunately, electrochemical capacitor devices using KOH electrolytes have failed to satisfy commercial needs for various reasons including for example, poor cycle life and an inability to achieve desired electrochemical performance characteristics.

In addition to the performance problems described above, electrochemical capacitor devices have also suffered from problems associated with the manufacture and packaging of such devices. It is the nature of electrochemical capacitors to require relatively small packages which develop high pulse power spikes. Prior art methods of assembling such devices however substantially increased the thickness of the device, as well as the complexity of the manufacturing process. Increased complexity resulted in manufacturing defects which caused yield losses. Moreover, as the package became thicker due to processing, the introduction of electrode equivalence series resistance (ESR) reduced the efficiencies of the devices fabricated.

Accordingly, there exists a need to provide a new process for manufacturing electrochemical capacitor devices. This process should emphasize ease and convenience of manufacturing while providing a thin profile device so as to reduce ESR.

DETAILED DESCRIPTION OF THE PREFERRED EMBODIMENT

Figure 1:
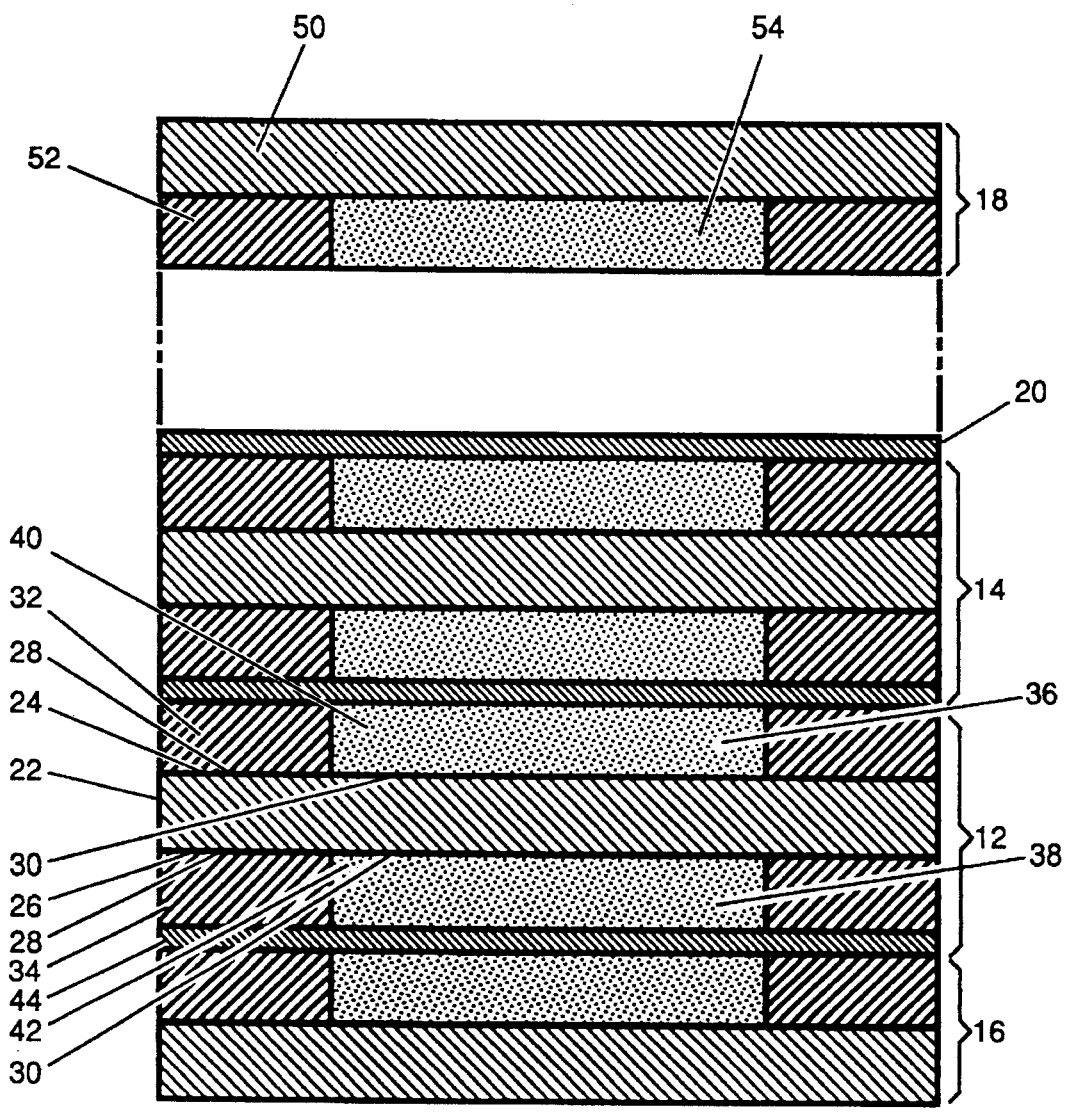
FIG. 1 is a cross sectional side view of an electrochemical capacitor device fabricated in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a cross-sectional side view of an electrochemical capacitor device in accordance with the instant invention. The electrochemical capacitor device (10) includes a plurality of stacked subassemblies (12–14). It is to be understood from a perusal of FIG. 1, however, that while only two stacked subassemblies (12–14) are illustrated, any number of such subassemblies may be arranged in stacked relationship so as to achieve an electrochemical capacitor device capable of providing a desired output. Disposed sub-adjacent subassembly (12) is a first end portion (16). Similarly disposed atop subassembly (14) is a second end portion (18). It may further be appreciated that between subassembly (14) and end portion (18) is disposed a layer (20) as will be described in greater detail hereinbelow.

As may be appreciated from a perusal of FIG. 1, each subassembly (12–14) is substantially identical. Accordingly, only subassembly (12) will be described herein with the understanding that subassembly (14) and any additional stacked subassemblies will be substantially identical to that described with respect to subassembly (12). With respect to each of subassemblies (12) and (14), each includes a current collecting electrode (22). The current collecting electrode (22) may typically be fabricated of any of a number of known materials such as for example, graphite, or a graphite coated onto a pinhole-free, corrosion resistant metal or metals. By corrosion resistant, it is meant a material inert in the presence of an electrolyte. In one preferred embodiment, the current collecting electrode (22) is fabricated as a thin graphite foil disk having a thickness of between 0.01 and 1.00 mm, and preferably about 0.1 mm thick.

Current collecting electrode (22) has a first major surface (24) and a second major surface (26), and peripheral and central regions (28 and 30) respectively. Disposed about the peripheral regions on the first and second major surfaces (24, 26) is an electrically insulating mechanical spacer having a central cavity formed therein, such as washers (32, 34). The spacer may be fabricated of a polycarbonate material such as Lexan or mylar. Another feature of the mechanical spacer is that it includes a pressure activated epoxy disposed on both sides thereof. Accordingly, said spacer (32, 34) is adapted to affixably seal to said current collecting electrode without the need for additional processing to assure a uniform, tight seal. As the electrically insulating mechanical spacer (32, 34) is a washer or gasket, it may be appreciated that such spacer (32, 34) defines a cavity located substantially above central region (30) of the current collecting electrode (22). Disposed or grown in these cavities (36, 38) is a layer of a second electrode material such as polyaniline, (40, 42). The polyaniline film electrodes (40, 42) may be soaked or coated with a proton conducting electrolyte such as, for example, sulfuric acid ($H_2SO_4$).

Disposed atop at least one spacer (34) and electrode layer (42) is a layer of a separator material (44) (if needed). Said separator material may be fabricated of any of a number of known separator materials known in the art, examples of which include polypropylene, nation, polyethylene oxide and polyacrylic acid and combinations thereof. In one preferred embodiment, the separator is a polypropylene separator having a thickness of less than approximately 100 μm. Layer (20) disposed atop the upper most subassembly (14) is a separator layer (20) such as layer (44).

Disposed adjacent the lower most subassembly (12) is first end portion (16). First end portion (16) and second end portion (18) disposed adjacent the top most subassembly (14) are both fabricated in substantially identical configurations. Hence only second end portion (18) will be described with reference hereto, with the understanding that first end portion (16) is fabricated in substantially an identical manner. The end portions (16 and 18) include a current collecting electrode (50) fabricated of a material such as that described hereinabove with respect to electrode (22) of subassembly (12). Disposed about the peripheral edge of current collecting electrode (50) is a mechanical spacer (52) fabricated of materials as described hereinabove with respect to subassembly (12). Likewise, disposed in the central cavity region defined by spacer is a layer of a second electrode material (54) again substantially identical to that described hereinabove with respect to subassembly (12). It maybe appreciated from a perusal of FIG. 1, that lower end portion (16) is disposed substantially adjacent to separator (44) of subassembly (12). Further as may be appreciated from a perusal of FIG. 1, in order to assure proper electrochemical behavior, upper end portion (18) is separated from the top most subassembly (14) by layer (20). Layer (20) is fabricated of a material substantially identical to that described hereinabove with respect to separator (44). Accordingly, with layer (20) as disposed in FIG. 1, top end portion (18) is then arranged in substantially adjacent relationship to the upper subassembly (14).

Figure 2:
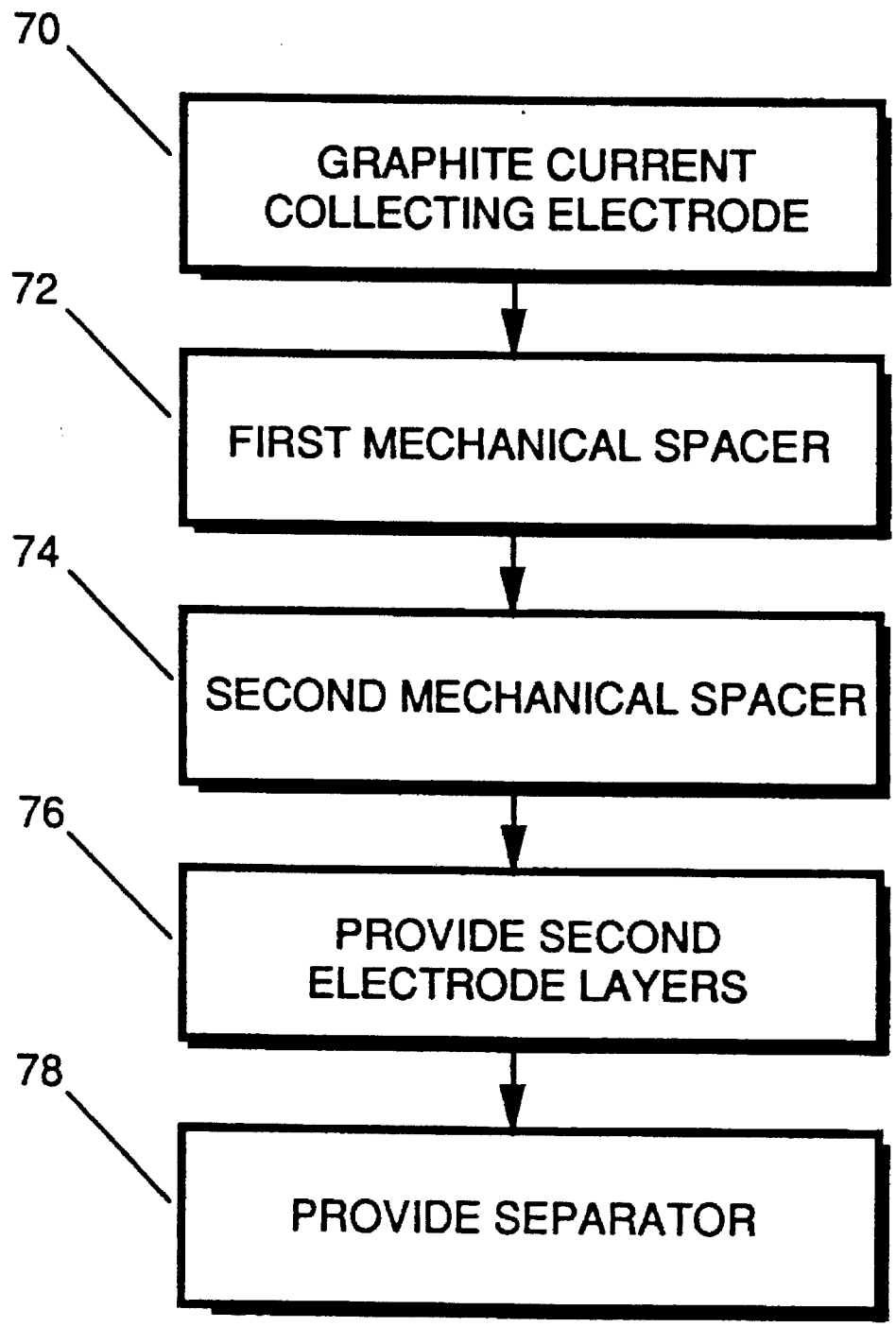
FIG. 2 is a flowchart illustrating the steps for assembling an electrochemical capacitor subassembly, in accordance with the instant invention.
Figure 3:
FIGS. 3–7 are cross sectional side views of an electrochemical capacitor subassembly at various steps in the fabrication process in accordance with the instant invention.
Figure 4:
Figure 5:
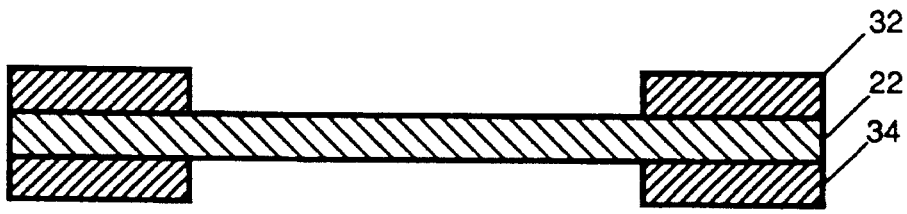

Referring now to FIGS. 2 and 3–7, there is illustrated therein respectively, a flow chart and a cross sectional side views illustrating the method of assembling an electrochemical capacitor device in accordance with the instant invention. Referring now to box 70 of FIG. 2, there is illustrated therein the step of providing a graphite current collecting electrode, FIG. 3 illustrates this step by illustrating the current collecting electrode (22) of FIG. 1. Step 2 of the fabrication process is illustrated in box 72 of FIG. 2 and FIG. 4, and illustrates the step of disposing an epoxy coated mechanical spacer such as washer (32) of FIG. 1. Similarly, Step 3 illustrated as box 74 of FIG. 2 and FIG. 5, illustrates the step of providing a second epoxy coated mechanical spacer, such as washer (34) on a second side of a current collecting electrode (22).

Figure 6:
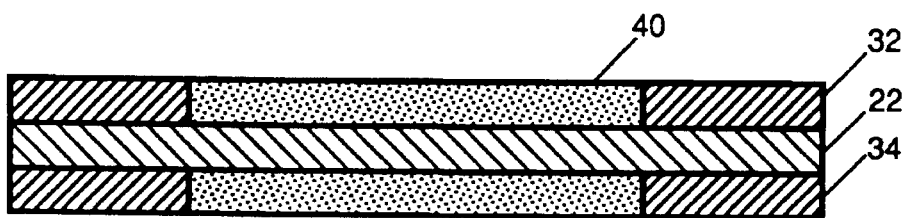
Figure 7:
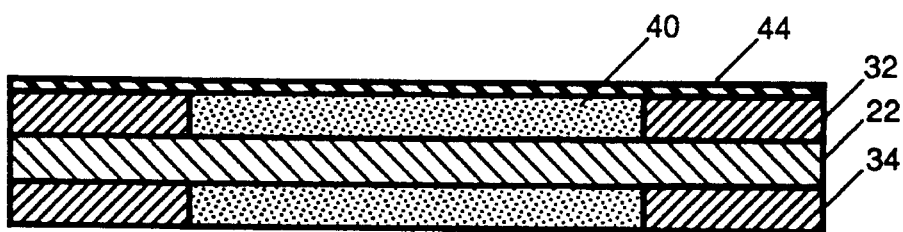

FIG. 6 and box 76 of FIG. 2 illustrate the step of disposing layers of second electrode material (40, 42) in the cavity defined by spacers, (32, 34). Though not illustrated, step 76 also contemplates the further step of providing a proton conducting electrolyte in intimate contact with the second electrode layer. Disposed atop at least one layer (40) and one spacer (32) is a separator (44) as described hereinabove. This step is illustrated in FIG. 7 and Box 78 of FIG. 2. It is to be appreciated that the subassembly illustrated in FIG. 7 may be assembled in a stacked relationship with a plurality of similar stacked assemblies so as to achieve a desired voltage for an electrochemical capacitor device as illustrated in FIG. 1.

Figure 8:
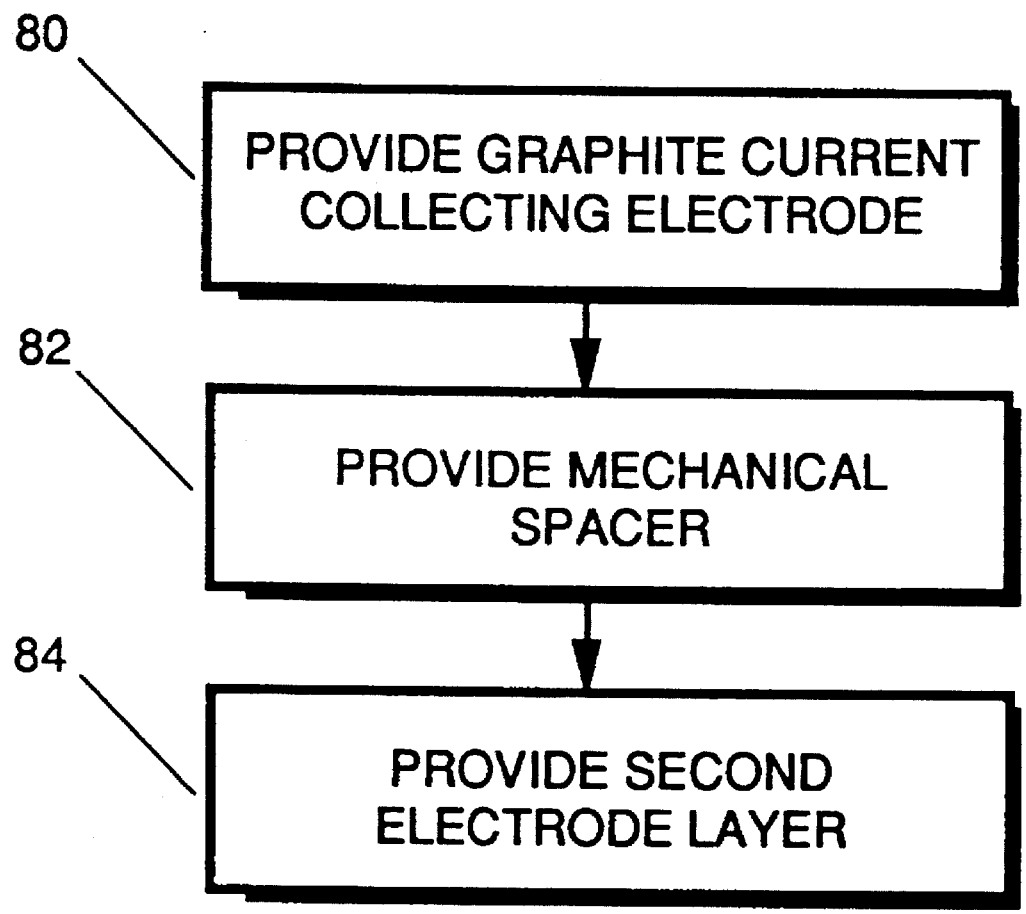
FIG. 8 is a flowchart illustrating the steps in fabricating end portion assemblies of an electrochemical capacitor in accordance with the instant invention.
Figure 9:
FIGS. 9–11 are cross sectional side views of an electrochemical capacitor end portion assembly at various steps in the fabrication process in accordance with the instant invention.
Figure 10:
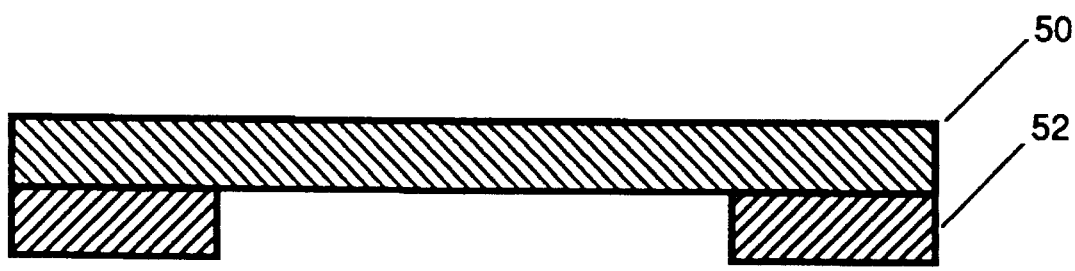
Figure 11:
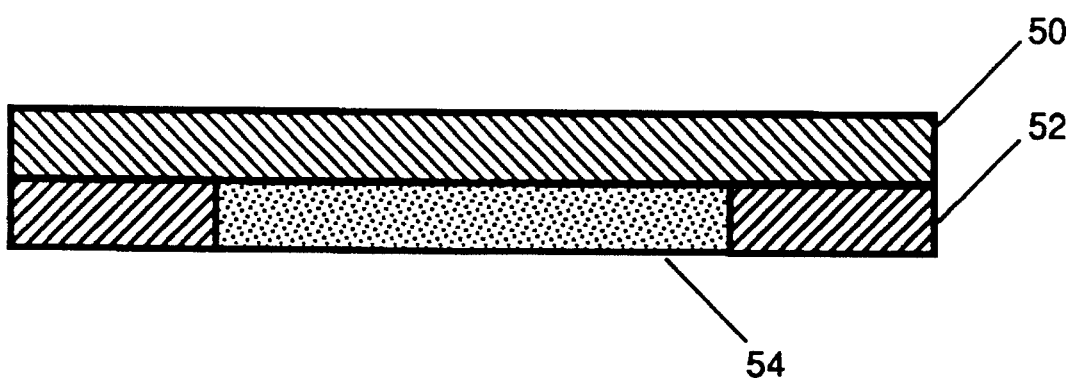

Referring now to FIGS. 8 and 9–11, there is illustrated therein the steps associated with fabricating the end portion for an electrochemical capacitor in accordance with the present invention. FIG. 8 illustrates a flow chart of the fabrication steps for the end portions (16 and 18) illustrated in FIG. 1. FIGS. 9, 10, and 11 illustrate the actual steps of assembling said end portions. Accordingly, the first step in the fabrication of end portion (16 and 18) includes providing a current collecting graphite electrode (50) shown in FIG. 9 and described in Box 80 of FIG. 8. Thereafter, as is illustrated in FIG. 10, and Box 82 of FIG. 8, an epoxy coated mechanical spacer (52) is disposed on one side of electrode (50). The epoxy coated spacer defines a central cavity into which is deposited a layer of second electrode material (54) as described hereinabove with respect to FIG. 1. This step is illustrated in FIG. 11 and Box 84 of FIG. 8.

Assembly of the end portions and the subassemblies is then accomplished as described hereinabove with respect to FIG. 1. Specifically the end portion (16) is disposed immediately adjacent separator (44), while a second separator (20) is disposed atop upper most subassembly (14), and adjacent end portion (18).

With respect to layers (40, 42), the second electrode layer is a polyaniline film grown on the graphite current collecting electrode (22). This polyaniline film may be fabricated by conventional potential cycling of aniline in a concentration range of 0.50 to 0.100M, in $H_2SO_4$ (1M). The range of the cycling voltage is between −0.001 to 1.0 volts. After depositing the layer of polyaniline material on the graphite electrode current collector, the electrode as well as separator (44) is wetted with a 1–5M solution of sulfuric acid $H_2SO_4$ which serves as the electrolyte for the system. The voltage window for the redox reaction of polyaniline on the graphite current carrier electrode is approximately 1.35 volts. This value is considerably greater than that known for polyaniline films on other substrates commonly used, such as platinum or carbon.

The polyaniline layers are electroactive electrode materials grown in sulfuric acid. Accordingly, polyaniline layer is intimately wet with the electrolyte. It grows with the morphology which results in a large surface area and therefore a large energy density due to both Faradaic reactions on its surface and its large surface area. During the process of fabricating the polyaniline material during the potential cycling, sulfuric acid which is used to grow the polyaniline film coats intimately with all the pores and surfaces of the polyaniline. Accordingly, problems associated with the wetting the electrochemically active material surface and filling its pores, are avoided. For this reason, sulfuric acid is considered a preferred embodiment for the electrolyte, though it is to be understood that other proton-conducting electrolytes may be used.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of fabricating an electrochemical capacitor comprising the steps of:

provifing at least one capacitor subassembly portion having first and second sides, and comprising a graphite current collector having a first and a second side, each side having a central region and a peripheral edge, said current collector having a thickness of between 0.01 and 0.5 mms, a mechanical spacer disposed about the peripheral edge of said first and said second sides of said graphite current collector, a layer of polyaniline electrode material disposed in the central region of said first and second sides of said current collector, and a separator disposed atop each said layer of second electrode material and said spacer; and providing a capacitor end portion on said first and said second side of said capacitor subassembly position, said capacitor end portion comprising a graphite current collector having first and second sides, each side having a central region and a peripheral edge, a mechanical spacer disposed about said peripheral edge of one side of said current collector, and a layer of electrode material disposed in said central region.

2. A method as in claim 1, including the further step of disposing said end portions on said subassembly position so that said spacer and said electrode layer of said end portions are adjacent said separator of said subassembly portion.

3. A method as in claim 1, including the further step of providing a plurality of capacitor subassembly portions arranged in a stacked configuration.

4. A method as in claim 1, including the further step of wetting the electrode layer with an $H_2SO_4$ solution.

5. A method as in claim 1, including the further step of providing an electrolyte and wherein said electrolyte is $H_2SO_4$.

6. A method as in claim 1, including the further step of providing a spacer having a thickness of less than 100 μm.

7. A method as in claim 1, including the further step of providing a polypropylene separator.

8. An electrochemical capacitor comprising at least one subassembly having a current collector having first and second surfaces, a layer of a polyaniline electrode material disposed on each said surface, and a proton conducting electrolyte.

9. An electrochemical capacitor as in claim 7, wherein said current collector is graphite.

10. An electrochemical capacitor as in claim 7, wherein said proton-conducting electrolyte is $H_2SO_4$.

11. An electrochemical capacitor as in claim 7, including a plurality of subassemblies arranged in stacked relationship, and where each subassembly is separated by a layer of separator material.

12. An electrochemical capacitor as in claim 11, wherein said separator is polypropylene.

13. An electrochemical cell as in claim 8, including a plurality of subassemblies arranged in stacked relationship, and where each subassembly is separated by a layer of separator material.

14. An electrochemical cell as in claim 7 further including an end portion disposed on each of said layers of polyaniline electrode material, said end portions comprising a current collector having a layer of a polyaniline electrode material disposed on one surface thereof.

15. An electrochemical cell as in claim 14, wherein said current collector is graphite.

16. An electrochemical cell as in claim 14 wherein said proton-conducting electrolyte is $H_2SO_4$.

17. An electrochemical cell as in claim 13, wherein said separator is polypropylene.

* * * * *